United States Patent [19]

Kudelski et al.

[11] Patent Number: 4,611,168

[45] Date of Patent: Sep. 9, 1986

[54] MAGNETIC TACHOMETER ASSEMBLY

[75] Inventors: Stefan Kudelski, Le Mont-sur-Lausanne; Ernest Rosselet, Assens, both of Switzerland

[73] Assignees: Ampex Corporation, Redwood City, Calif.; Kudelski S.A., Lausanne, Switzerland

[21] Appl. No.: 533,902

[22] Filed: Sep. 15, 1983

[30] Foreign Application Priority Data

Sep. 17, 1982 [GB] United Kingdom ................ 8226573

[51] Int. Cl.⁴ .......................... G01P 3/48; G01P 3/54
[52] U.S. Cl. .................................. 324/174; 310/168
[58] Field of Search ............... 324/173, 174; 310/168, 310/170; 361/240, 243

[56] References Cited

U.S. PATENT DOCUMENTS 2,798,976 7/1957 Eckel et al. ...................... 324/174 X
3,739,211 6/1973 Hasler ............................. 324/174 X

FOREIGN PATENT DOCUMENTS 1201310 8/1967 United Kingdom ................ 324/174

OTHER PUBLICATIONS

Goretzki et al, Slotted Probe to Achieve Multiple Cycles per Emitter Tooth, 2-1971, p. 2579.

Primary Examiner—Reinhard J. Eisenzopf
Assistant Examiner—Jack B. Harvey
Attorney, Agent, or Firm—Harry G. Thibault; Joel D. Talcott

[57] ABSTRACT

A tachometer assembly comprises two toothed rings (68, 70) in approximate axial register. The rings have similar peripheries of which the teeth (69, 71) are closely spaced in the axial direction of the rings. Magnetic flux in a path extending axially of the teeth varies as the rings rotate and is sensed by a coil (74) disposed coaxially of the rings.

11 Claims, 3 Drawing Figures

MAGNETIC TACHOMETER ASSEMBLY

BACKGROUND TO THE INVENTION

This invention relates to magnetic tachometers and particularly to an improved tachometer for monitoring the speed of a rotary member which forms part of rotating equipment such as a motor.

One example of the use of the present invention is in a video tape recorder, in which tape must be driven at a controlled speed past a scanner assembly which normally comprises a drum around which tape is wrapped in a helical path so as to be scanned obliquely by a head which is driven at a high, controlled speed. In order to control the speed of, for example, the capstan within close limits, it is usual to provide a tachometer generator in order to derive a feedback signal for a servo-mechanism for the capstan. This is particularly important in order to ensure stability of the recording or playback of a video signal on magnetic tape.

The present invention finds particular application in a battery operated portable video tape recorder which requires a capstan and motor of very low inertia. The design of a tachometer for such and similar purposes presents considerable problems, for it is desirable to achieve a tachometer which can produce a high frequency output yet be of comparatively simple and light-weight construction.

It is therefore one object of the present invention to provide an improved tachometer.

Although the present invention will be described in relation to a tape-driving capstan, the tachometer described herein is also of use elsewhere in tape transport, for example in a scanning drum of a helically scanning video tape recorder. It is equally desirable to provide control of the speed of the scanning drum and for this purpose to provide a tachometer which can conveniently be incorporated between the rotary and fixed parts of such a drum.

SUMMARY OF THE INVENTION

In a preferred embodiment of the invention a tachometer assembly comprises two toothed rings disposed in approximate axial register, and of which one is carried on a rotary member (which may be the rotary part of a capstan or scanning drum) and of which the other is relatively fixed. The two rings have similar toothed peripheries of which the teeth are closely spaced apart in the axial direction of the rings. Means are provided to produce magnetic flux in a flux path which extends axially of the rings and through the gap therebetween. Relative movement of the rings produces a variation of flux density which may be sensed by an appropriately positioned coil. This coil may be disposed coaxially with the rings and between them.

Preferably the flux is produced by a ring magnet which is mounted closely adjacent one of the rings, preferably the stationary ring. Such a magnet can produce a uniform flux around the periphery of the tachometer.

The disposition of the teeth in axial register facilitates the provision of a single loop for the magnetic circuit and, preferably in combination with a ring magnet as aforesaid, facilitates the construction of the tachometer in a compact form which may be incorporated into a motor without substantial mutual interference. These features separately and in combination provide significant advantages over known practice.

Various other objects and advantages of the invention will be apparent from the following description and the drawings to which the description refers.

DESCRIPTION OF THE ACCOMPANYING DRAWINGS

DETAILED DESCRIPTION OF THE PREFERRED EMBODIMENT

Figure 1:
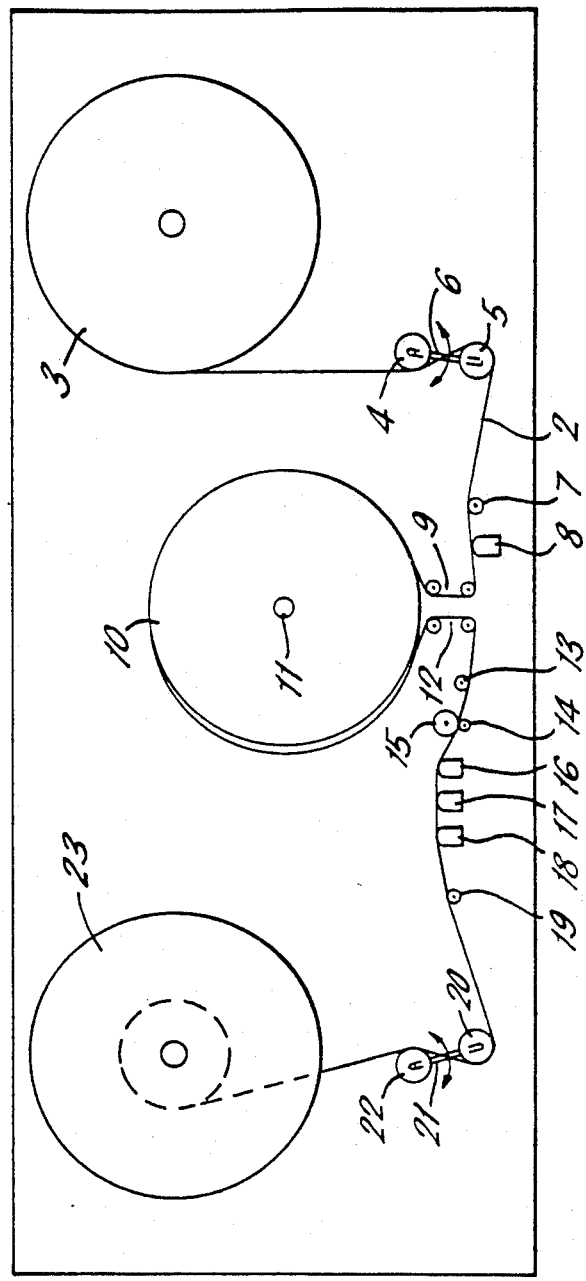
FIG. 1 is an explanatory schematic diagram of the principal parts of a video tape recorder.

FIG. 1 illustrates in simplified form the principal parts of a video tape recorder, this recorder being an example of a system in which the capstan, its motor and the servo-mechanism described later may conveniently be used. As is shown in FIG. 1, the recorder 1 is intended for recording signals on or playing back signals from a magnetic tape 2 which is supplied by a supply reel 3 driven by a motor not shown. From the supply reel the path of the tape 2 extends around a rotatable guide post 4 and thence to a rotatable guide 5 which is carried at one end of an arm 6 mounted coaxially with the guide 4. The purpose of the pivoted arm is to provide sensing of the tension of tape in a loop around the guide 5, it being apparent that if the tension in the tape of this loop increases, the arm 6 will rotate. The rotation of the arm can be sensed by any convenient known means and used in known manner to control the motor which drives the reel 3 in order to maintain a substantially constant length of tape in the loop.

From the guide 5 the path of the tape extends past a guide 7 and a video erase head 8 to a pair of guides 9 controlling the entrance of the tape to a helical path extending around a drum 10 of which the axis 11 is slightly tilted relative to the general plane of the path of the tape. Within the drum is a motor driving around the periphery of the drum a scanning head for the scanning of the tape in oblique tracks, in a manner generally known per se. At the end of the helical path of the tape around the drum 10 the tape passes around a pair of guides 12 and extends past a guide 13 to a capstan 14 which is provided with a pinch roller 15 for the maintenance of the tape in close proximity to the capstan. The tape path extends from the capstan past erase, audio and control track heads 16 to 18, a further guide post 19, a guide 20 mounted at one end of a pivoted arm 21, a guide post 22 disposed coaxially with the pivot for the arm 21 and finally to a take-up reel 23. The guide 20 acts in a manner similar to the guide 5, the pivoting movement of the arm 21 providing a measure of the tension in the loop of tape around the guide 20 and providing a control for the motor (not shown) which drives the take-up reel 23.

The longitudinal speed of traverse of the tape is controlled by the capstan 14, which must provide high performance, and be driven with a considerable degree of stability.

Figure 2:
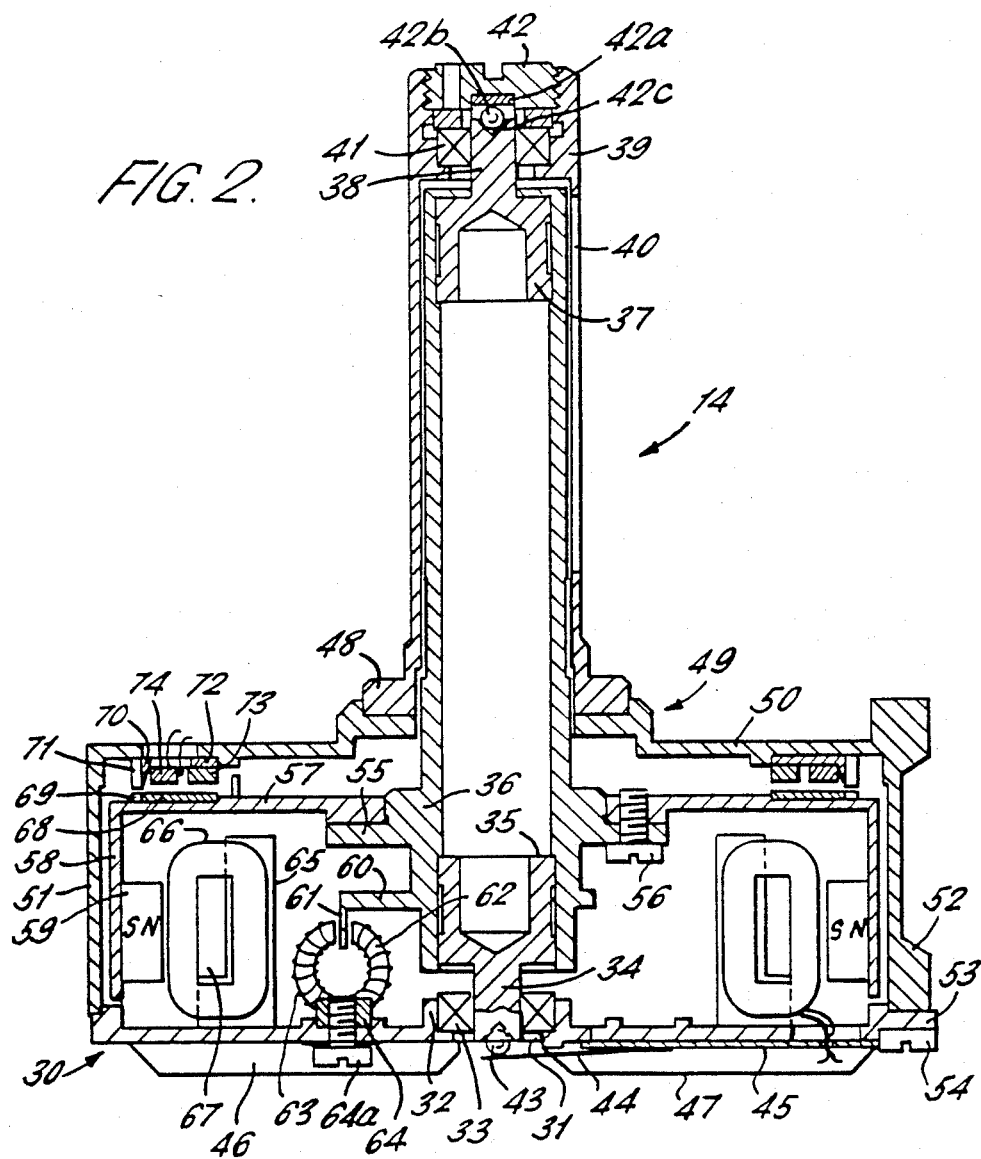
FIG. 2 is a sectional view of an improved capstan and tachometer assembly for use in the recorder depicted in FIG. 1.

FIG. 2 illustrates a preferred construction for the capstan 14.

The capstan 14 has a base plate 30 which has a central aperture 31 and surrounding the aperture an upwardly extending annular flange 32 which accommodates a bearing 33. The bearing supports for rotation a spigot 34 constituting a lower extension of a cylindrical bush 35 fitted within a cylindrical capstan member 36 which extends upwardly. At the top end of the capstan member 36 is an upper bushing 37 from the top end of which extends a spigot 38. Surrounding (with a small clearance) the member 36 for most of the length thereof and extending above the top of the member 36 is a generally cylindrical shell 39 which has an aperture 40 extending axially of the capstan member 36 and also extending around a substantial part of the periphery of the member 36 so as to enable the outer surface of the capstan member to engage the tape 2. At the upper end of the shell 39 is supported an upper bearing 41 in which the spigot 38 is received for rotation. The top end of the shell is closed by a screw-threaded plug 42, which carries a sapphire seat 42a engaged by a ball 42b disposed in a conical seat 42c in the top of the spigot 38.

At the end of the lower spigot 34 of previous mention is accommodated a ball 43 which protrudes below the spigot 34 and is engaged by a leaf spring 44 secured, for example, by adhesive to a plate 45 likewise secured to the underside of the plate 30. The spring 44 in conjunction with the ball 43 provides an electrical earth for the capstan member 36.

Below the base plate 30 extend radial ribs 46 and 47 which reinforce the plate 30.

At its lower end, the shell 39 is provided with a radial flange 48 by means of which it is mounted at the inner margin of the housing 49 for the motor which drives the capstan. The housing 49 consists principally of an annular plate 50 forming the top cover for the housing and a cylindrical side wall 51 extending downwardly from the periphery of the plate 50 to engage the periphery of the base plate 30. Extending vertically down the side wall 51 is a plurality of ribs 52, of which only one is shown. The ribs 52 are secured to outwardly extending lugs 53 from the base plate 30 by respective screws 54 (of which only one is shown). The housing 49 defines a generally annular space within which the motor is accommodated.

The cylindrical capstan member 36 has near its bottom end a radially extending flange 55 to which is secured, by means of screws such as the screw 56, the inner periphery of an inverted dish-shaped rotor comprising an annular portion 57 which is generally parallel to the cover plate 50 and a depending cylindrical wall 58 parallel to and just inside the cylindrical wall 51 which forms part of the housing 49. The rotor may be made of iron in order to provide a magnetic shield surrounding the motor, of which the stator is wholly accommodated within the space defined by the cylindrical wall 58.

The motor employed in the preferred embodiment of the capstan is a brushless DC motor. In such a motor, the magnetic circuit rotates whereas the windings which are normally disposed on the rotor of a DC motor are fixed in position. In the motor shown in FIG. 2, the rotor carries a plurality of permanent magnets 59, which are disposed at equally spaced intervals around the inner side of the wall 58 forming part of the rotor.

Below the location of the flange 55 are outwardly extending arms (of which only one is shown in the drawing), each such arm 60 having a magnetically permeable depending lug 61 of which the path of rotation extends through a gap in a part circular magnetically permeable core 62 which carries a coil 63 and is supported in a block 64 secured to the base plate 30 by means of a bolt 64a. The purpose of the coil 63 is to sense the entry of the lug 61 into the core 62 and thereby provide an indication of a particular angular position of the rotor for the capstan. As is well-known, a brushless DC motor must be provided with a switching circuit which acts in the manner of a commutator to switch the directions of current in the various parts of the stator winding. Although the particular construction and operation of the commutator circuit is not critical to the present invention, any of the known switching arrangements being suitable, the sensing coil 63 in conjunction with the extension of the rotor formed by the arm 60 and the lug 61 provides a convenient and reliable means of timing the switching performed by the commutation circuit. In general, the number of coils 63 will depend upon the number of phases of the stator winding and the number of lugs 61 will depend on the number of magnets provided on the rotor.

The stator winding, which in a brushless DC machine corresponds to the armature winding of an ordinary DC machine with commutator segments, is carried by a slotted annular member 65 disposed concentrically with the axis of the capstan and disposed on the base plate 30. The stator winding is illustrated diagrammatically at 66 and is wound around a former 67. The winding 66 extends in a circle concentric with the axis of the motor closely adjacent the annular path in which the magnets 59 travel. The magnets 59 are axially displaced from symmetry with respect to the winding 66 so that the rotor is urged upwardly, the upward pressure being sustained by the sapphire seat. Thus the capstan needs only one thrust bearing, which is constituted by the readily accessible ball 42b and seat 42a.

The capstan includes its own tachometer. This tachometer relies on a coil to sense the variation in magnetic flux caused by the variable reluctance of a magnetic circuit which extends between two similarly toothed annuli arranged in substantial axial register. One of the toothed rings is shown at 68, being carried on the upper surface of the plate 57 forming part of the rotor. Thus the ring 68 is disposed in a plane normal to the axis of the capstan and its rotor and is arranged concentrically of the capstan. The ring 68 has a toothed periphery 69, being formed in the manner of a gear wheel. The other ring, which is of similar radial dimension, is shown at 70. This ring has a toothed periphery similar in radial section to that of the ring 68. However, the ring 70 is made of greater axial depth at its outer periphery, so that the teeth 71 are of greater axial depth than the teeth 69. Inwardly of the periphery of the ring 70 is disposed a coil 74 which may have a plurality of turns and is disposed concentrically with the rings and thereby coaxially of the capstan and its rotor. The ends of this coil may be taken externally of the capstan housing by means of slots in the ring 70 and a cooperative slot in the cover plate 50.

Radially inwardly of the coil and disposed closely adjacent the lower side margin 72 of the ring 70 is a ring magnet 73, likewise arranged coaxially of the capstan assembly. This ring magnet is polarised in the axial direction so as preferably to produce a peripherally uniform magnetic flux.

Figure 3:
FIG. 3 is a drawing illustrating a detail of the assembly shown in FIG. 2.

There is a single flux path which extends radially of the ring 70, axially across the annular gap between the teeth 71 and 69, radially of the ring 68 and axially across the annular gap formed between the ring magnet 73 and the ring 68. This flux path is compact and is easily shielded from the strong magnetic fields of the motor by means of the rotor constituted by the annular portion 57 and the wall 58. As is shown in FIG. 3, which illustrates in plan view part of the ring 68 and its teeth 69 and also, in ghost, the teeth 71 of the ring 70, as the rotor of the capstan motor moves, the teeth 69 and 71 go into and out of axial register, thus varying the reluctance of the air gap between them and therefore the flux density. The variation in flux density is approximately sinusoidal and is averaged around the common periphery of the rings 68 and 70. Thus the construction can provide quite an accurate sinusoidal representation of the movement between the rotor and the stationary parts of the motor and minor tolerances in machining are to a large extent smoothed out, it being readily feasible to process the signal obtained from the coil 74, which links with the flux path, to achieve a substantially pure sinusoid.

The inner gap which is between the relatively rotatable parts and is actually defined between the ring magnet 73 and the ring 68, is preferably uniform.

The capstan and motor described with reference to FIGS. 2 and 3 are of quite simple construction and can readily (and preferably) be made of low inertia.

We claim:

1. A tachometer for a rotary member which can rotate relatively to a support, said tachometer comprising:
   a first ring carried for rotation with the rotary member and being mounted coaxially therewith;
   a second ring mounted adjacent the first ring, aligned in axial register therewith, and mounted in fixed relation to the support, each of the rings being magnetically permeable and having correspondingly toothed peripheries disposed in close proximity and each coplanar with its respective ring, said rings defining an annular air gap axially positioned between the two rings;
   a ring shaped magnetic member, disposed adjacent one of said rings and disposed coaxially relative thereto, for producing magnetic flux in said rings, said flux extending across the air gap throughout the peripheral regions of the rings to generate a compact flux path across the gap and the two rings, and
   means for sensing variation in said flux as the rings rotate relative to each other.

2. A tachometer as set forth in claim 1 wherein the magnetic member partly defines an air gap between said rings and spaced radially of said toothed peripheries, whereby to establish a single flux path comprising said rings and said gaps.

3. A tachometer according to claim 1 or claim 2, wherein the means for sensing comprises a sensing coil disposed between said rings and coaxial therewith.

4. A tachometer as set forth in claim 2 wherein said second ring has an axially extending portion in the region of its periphery.

5. A tachometer according to claim 4, wherein said coil is disposed adjacent said portion.

6. A tachometer for a rotary member which is rotatable relative to a support, said tachometer comprising:
   a first ring carried for rotation with the rotary member and being mounted coaxially therewith;
   a second ring mounted adjacent the first ring, aligned in axial register therewith, and mounted in fixed relation to the support, each of the rings being magnetically permeable and having correspondingly toothed peripheries disposed in close proximity and each coplanar with its respective ring, said rings defining an outer annular gap in the region of said peripheries and an inner annular gap spaced inwardly of said outer gap, said gaps being axially positioned between the two rings;
   a ring-shaped magnetic member coaxial with said rings for producing magnetic flux in said rings, said flux extending across the gaps, to generate a compact flux path including the gaps and rings; and
   a sensing coil disposed coaxially of said rings, said coil extending closely adjacent one of said rings and between the said gaps.

7. A tachometer as set forth in claim 6 wherein said magnetic member is carried for rotation with said first ring and coaxially therewith.

8. A tachometer as set forth in claim 7 wherein said magnetic member is disposed between the rings and in the region of the inner gap.

9. A tachometer comprising a first part, rotatable on an axis, a second magnetically permeable part mounted adjacent the first part, aligned therewith, and having an outwardly toothed periphery coplanar with said second part extending around an axis, said first part having an outwardly toothed periphery coplanar therewith which is spaced axially of the toothed periphery of the second part so as to define therewith an annular gap of which the reluctance varies as the first part rotates relatively to the second part, means for establishing a magnetic flux path which extends radially of said first part, across the said gap, radially of the second part and across a second annular gap between the two parts, to define a single, compact flux path, and means for sensing variation in reluctance of the flux path.

10. A tachometer according to claim 9 in which the means for establishing the magnetic flux path includes a ring magnet disposed in the region of the said second gap.

11. A tachometer for a rotary member which can rotate relatively to a support, said tachometer comprising:
   a first ring carried for rotation with the rotary member and being mounted coaxially therewith;
   a second ring mounted adjacent the first ring, aligned in axial register therewith and mounted in fixed relation to the support, each of the rings being magnetically permeable and having correspondingly toothed peripheries disposed in close proximity and each coplanar with its respective ring, said rings defining an annular air gap axially positioned between the two rings;
   a ring shaped magnetic member, disposed adjacent one of said rings and disposed coaxially relative thereto, for producing magnetic flux in said rings, said flux extending across the air gap throughout the peripheral regions or the rings;
   said magnetic member partly defining an air gap between said rings and spaced radially of said toothed peripheries, to establish a single compact flux path comprising said rings and said gaps, and
   means for sensing variation in said flux as the rings rotate relative to each other.

* * * * *